United States Patent
Chu

(10) Patent No.: US 8,255,165 B2
(45) Date of Patent: Aug. 28, 2012

(54) METHOD FOR PREDICTING DIFFERENCES IN SUBSURFACE CONDITIONS

(75) Inventor: Dezhi Chu, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 426 days.

(21) Appl. No.: 12/625,809

(22) Filed: Nov. 25, 2009

(65) Prior Publication Data

US 2010/0161230 A1 Jun. 24, 2010

Related U.S. Application Data

(60) Provisional application No. 61/138,885, filed on Dec. 18, 2008.

(51) Int. Cl.
*G01V 1/28* (2006.01)
(52) U.S. Cl. ........................................... 702/11; 367/73
(58) Field of Classification Search .................. 702/6, 9, 702/11–14, 17, 18; 703/10; 367/14, 38, 367/73

See application file for complete search history.

(56) References Cited

U.S. PATENT DOCUMENTS 5,229,976 A * 7/1993 Boyd et al. ..................... 367/73
5,835,882 A * 11/1998 Vienot et al. .................... 702/7

OTHER PUBLICATIONS

Cary, P. and Capman, C. H. (1988) "Automatic 1-D Waveform Inversion of Marine Seismic Retraction Data," *Geophy. Journal* 105, pp. 289-294.
Shankar, V. et al. (2006) "Texture Anaylsis for Automated Classification of Geologic Structures," *IEEE Southwest Symposium*, pp. 81-85.
EP Search Report dated Oct. 15, 2009, 5 pages.

* cited by examiner

*Primary Examiner* — Manuel L Barbee
(74) *Attorney, Agent, or Firm* — ExxonMobil Upstream Research Company Law Dept.

(57) ABSTRACT

A method for predicting differences in subsurface conditions useful in 4D applications. In an example embodiment of the method, at least one layer is defined in a data volume representing a first subsurface condition such as shale volume fraction (104). An exhaustive search methodology is then performed over a second subsurface condition such as pressure or saturation for some or all of the first subsurface condition data points (106) based on a data fit of synthetic geophysical data to measured geophysical data. The exemplary method may additionally comprise performing a statistical analysis to determine whether the error in data fit is significantly reduced (110) if one of the layers is divided into two or more layers (108). The layer is divided into multiple layers (114) if the error is significantly reduced (112). In this manner, the measured survey data are inverted to predict values of the second subsurface condition.

16 Claims, 6 Drawing Sheets

500

┌─────────────────────────────────────────────────────────────────┐
│ Code Adapted to Represent At Least One Layer Comprising a Plurality │ — 502
│ of Data Points in a Data Set Representing a First Subsurface Condition, │
│ the At Least One Layer Representing a Subsurface Region that is │
│ Predicted to Contain Hydrocarbons │
├─────────────────────────────────────────────────────────────────┤
│ Code Adapted to Perform an Exhaustive Search Methodology Using a Set │ — 504
│ of Parameters Corresponding to a Second Subsurface Condition for Each │
│ of the Plurality of Data Points in the First Data Set that Relate to the │
│ At Least One Layer │
├─────────────────────────────────────────────────────────────────┤
│ Code Adapted to Perform a Statistical Analysis to Determine Whether an │ — 506
│ Error in Data Fit Can Be Significantly Reduced by Dividing the At Least │
│ One Layer into Two Layers │
├─────────────────────────────────────────────────────────────────┤
│ Code Adapted to Divide the At Least One Layer into At Least Two Layers │ — 508
│ if the Error is Significantly Reduced │
└─────────────────────────────────────────────────────────────────┘

FIG. 5

METHOD FOR PREDICTING DIFFERENCES IN SUBSURFACE CONDITIONS

CROSS REFERENCE TO RELATED APPLICATIONS

This application claims the benefit of U.S. Provisional application 61/138,885 which was filed on Dec. 18, 2008.

FIELD OF THE INVENTION

Exemplary embodiments of the present invention relate to a method for predicting fluid and pressure change in a subsurface environment.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

In the oil and gas industry, seismic prospecting techniques commonly are used to aid in the search for and evaluation of subterranean hydrocarbon deposits. A seismic prospecting operation consists of three separate stages: data acquisition, data processing, and data interpretation, and success of the operation depend on satisfactory completion of all three stages.

In the data acquisition stage, a seismic source is used to generate an acoustic signal that propagates into the earth and is at least partially reflected from one or more laminated layers (impedance contrasts). The target layer in the subsurface may be one layer or a number of layers in which one is interested. In the latter case, the layers can be separated by layers that are not of interest. The sub-surface geologic boundaries have adjacent layers which have different lithology and physical properties. These layers present different densities and velocities to a seismic signal initialed by the source. The product of density and velocity of seismic energy transmission through each layer is called seismic impedance. The impedance contrast between adjacent layers causes the reflections that are recorded on the seismic traces. The recorded seismic trace can be modeled as a convolution of the earth's impulse response with the seismic signal produced by the source.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage. The results of the data interpretation stage may be used to determine the general geologic structure of a subsurface region, or to locate potential hydrocarbon reservoirs, or to guide the development of an already discovered reservoir.

Data processing frequently requires long computation times, and seismic analysts are forced to simplify the data processing effort as much as possible to reduce the burdens of both analysis time and cost. In addition to the computation challenge, the analyst faces a processing volume challenge. For example, a typical data acquisition exercise may involve hundreds to hundreds of thousands of source locations, with each source location having hundreds of receiver locations. Because each source-receiver pair may make a valuable contribution to the desired output image, the data handling load (i.e. the input/output data transfer demand) can be a burden in itself, independent of the computation burden.

A well-understood challenge to the seismic data analyst is to develop data processing procedures that are efficient and cost-effective to implement on the computer system available to the analyst. There is a continuing need to reduce the cost and time required for completing a data processing analysis as compared to prior art techniques.

Some data processing procedures use processing methodology called "exhaustive search" which tests many possible scenarios (e.g., combinations of data values to be considered) to find a globally optimal solution. The number of data values to be considered for each scenario may be referred to herein as a dimension. Exhaustive search has been widely used to derive a global optimal solution for geophysical problems such as texture analysis. In such an analysis, data is evaluated for two or more parameters of interest. An exhaustive search is performed by holding a first parameter of interest constant while iteratively evaluating a range of data values for a second parameter of interest. The result for each value of the second parameter of interest is compared to known data and an error is measured. Data values for the first parameter of interest are then varied. The scenario of data values that produces the result that has the least error with respect to known data is determined to be correct. The scenario that is determined to be correct may then be used to predict values for cases in which no known data exists. Although an advantage of exhaustive search is its ability to find a globally optimal solution, the number of scenarios to evaluate increases exponentially as the number of dimensions to be considered increases.

Four-dimensional (4D) seismic data, sometimes called time-lapse seismic, is a term that refers to performing an initial, or base, seismic survey of a subsurface region, then performing at least one later, or monitor, survey of the same region, attempting to duplicate the acquisition parameters and conditions as closely as possible. This enables comparison of seismic images of the subsurface over intervals of months or years of time to detect changes due to production of hydrocarbons or injection of fluids. More generally, the term base survey may refer to any survey performed earlier in time than the survey referred to as the monitor survey; i.e., the base survey may refer to an earlier monitor survey.

In a geoscience application, such as deriving saturation and pressure change from 4D seismic data, the number of scenarios that are evaluated in an exhaustive search methodology can be very large for a multilayered reservoir. As a result, it is generally not practical to evaluate saturation and pressure changes using an exhaustive search methodology on 4D seismic data. In addition, inferring vertical connectivity using 4D seismic data is also computationally complex. Moreover, inferring vertical connectivity from 4D seismic data has been done qualitatively before, but not quantitatively.

For problems having too many scenarios to make exhaustive search computationally practical, a Monte Carlo method is frequently used to randomly generate a finite set of scenarios to imitate the global space. The number of scenarios generated for the Monte Carlo method is rather subjective. Moreover, the use of the Monte Carlo method to reduce the number of scenarios that are evaluated in a problem involving large dimensions involves a tradeoff between the number of scenarios and the representation of the full solution space. As such, an improved method of analyzing 4D seismic data to optimize the application of an exhaustive search methodology is desirable.

SUMMARY OF THE INVENTION

A method for predicting differences in subsurface conditions is provided. An exemplary embodiment of the method comprises defining at least one layer comprising a plurality of data points in a data set representing a first subsurface condition, the at least one layer representing a subsurface region that is predicted to contain hydrocarbons. An exhaustive search methodology is performed using a set of parameters corresponding to a second subsurface condition for each of the plurality of data points in the first data set that relate to the at least one layer. The exemplary method may additionally comprise performing a statistical analysis to determine whether an error in data fit from the second subsurface condition relative to known data is significantly reduced if one of the layers is divided into two layers. The at least one layer is divided into at least two layers if the error is significantly reduced. Finally, the exemplary method comprises predicting a difference in the second subsurface condition over time.

In one exemplary embodiment of the present invention, the first subsurface condition comprises an index that represents a volume of shale (Vsh) at a particular point in the subsurface region. The second subsurface condition may comprise a pressure, a saturation of oil, a saturation of water, vertical connectivity or the like. The statistical analysis may comprise, for example, an F-test.

According to an exemplary embodiment of the present invention, when two divided layers are determined to have no significant impact on the data fitting, they are merged back into one layer and are considered connected.

An exemplary method for producing hydrocarbons from an oil and/or gas field is also provided. This exemplary method may comprise gathering a first data set representative of a first subsurface condition in the oil or gas field and gathering a second data set representative of a second subsurface condition in the oil or gas field. Both the first data set and the second data set may comprise a plurality of data points. The exemplary method of producing hydrocarbons may comprise defining at least one layer comprising a plurality of data points in the first data set, the at least one layer representing a subsurface region in the oil or gas field that is predicted to contain hydrocarbons. An exhaustive search methodology may be performed using a set of parameters corresponding to the second subsurface condition for each of the plurality of data points in the first data set that relate to the at least one layer. Thereafter, a statistical analysis may be performed to determine whether an error in data fit from the second subsurface condition relative to known data is significantly reduced if a layer is divided into two layers. The at least one layer may be divided into at least two layers if the error is significantly reduced.

In one exemplary method of producing hydrocarbons, the first subsurface condition comprises an index that represents Vsh at a particular point in the subsurface region. The second subsurface condition may comprise a pressure, a saturation of oil, a saturation of water, vertical connectivity or the like. The statistical analysis may comprise an F-test.

Two divided layers having no significant impact on the data fit may be merged back into one layer. In such a case, the layers may be considered connective with each other. The search for an optimal set of parameters of the second subsurface condition involves defining an impact window related to seismic wavelength to reduce the parameter space that needs to be searched for a given layer.

A tangible, machine-readable medium according to an exemplary embodiment of the present invention is also provided. An exemplary tangible, machine-readable medium may comprise code adapted to represent at least one layer comprising a plurality of data points in a data set representing a first subsurface condition, the at least one layer representing a subsurface region that is predicted to contain hydrocarbons. Such an exemplary tangible, machine-readable medium may comprise code adapted to perform an exhaustive search methodology using a set of parameters corresponding to a second subsurface condition for each of the plurality of data points in the first data set that relate to the at least one layer. In addition, the exemplary tangible, machine-readable medium may comprise code adapted to perform a statistical analysis to determine whether an error in data fit can be significantly reduced by dividing the at least one layer into two layers. Finally, code adapted to divide the at least one layer into at least two layers if the error is significantly reduced may be stored on the exemplary tangible, machine-readable medium. In one exemplary tangible, machine-readable medium, the statistical analysis comprises a statistical F-test.

DESCRIPTION OF THE DRAWINGS

The advantages of the present invention will be better understood by referring to the following detailed description and the attached drawings, in which:

FIG. 5 is a block diagram showing a tangible, machine-readable medium that stores code adapted to perform a method in accordance with an exemplary embodiment of the present invention.

Figure 1:
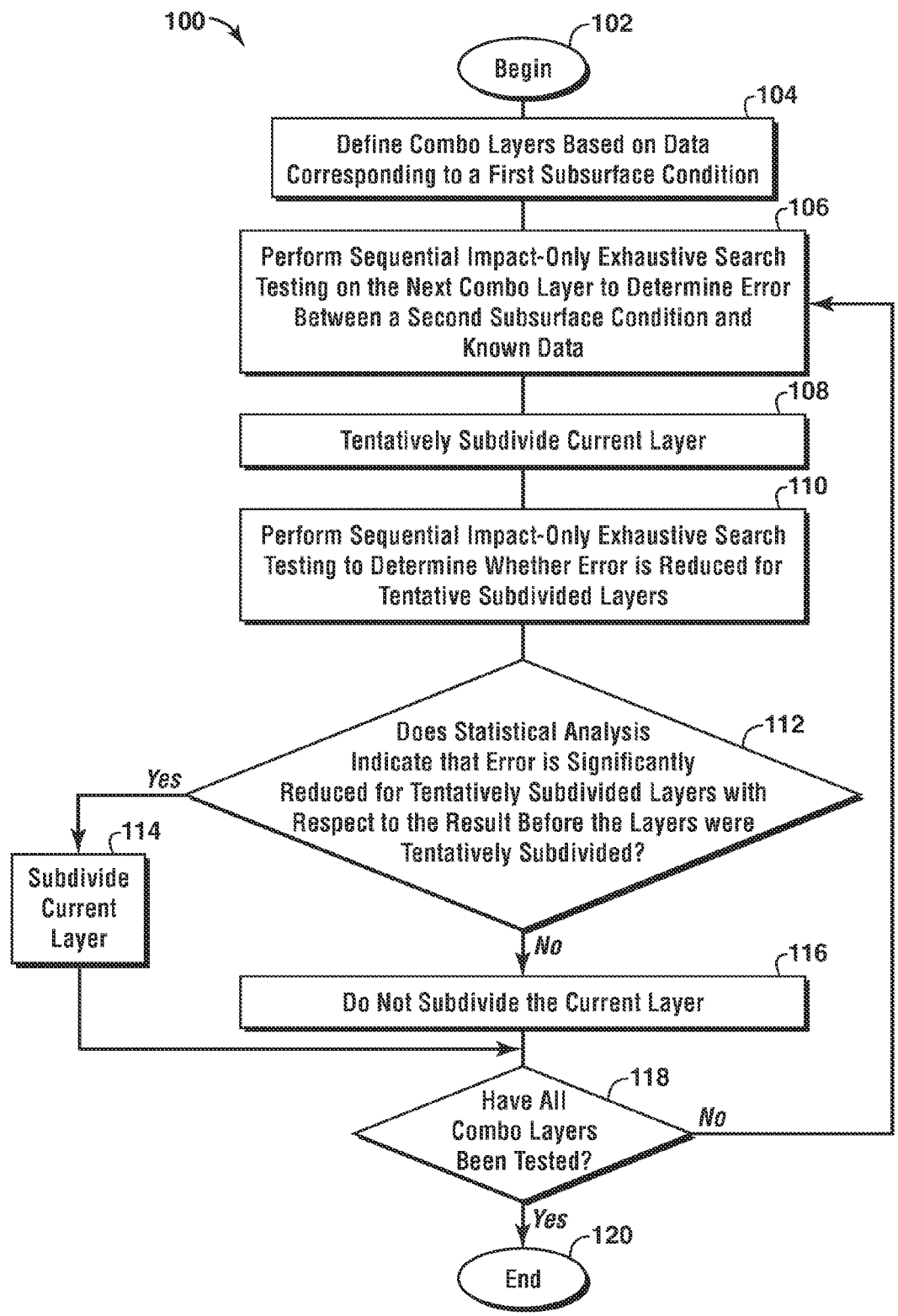
FIG. 1 is a process flow diagram showing a method for predicting differences in subsurface conditions in accordance with an exemplary embodiment of the present invention.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION OF THE INVENTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, "4D" and "four-D" refer to time-lapse seismic surveying that takes into account 4-dimensional seismic, wherein time between acquisitions represents a fourth data dimension. The three other dimensions relate to the spatial characteristics of the earth formation, two being horizontal length dimensions, and the third relating to depth in the earth formation, which can be represented by a length coordinate, or by a time coordinate such as the two-way travel time of a seismic wave from surface to a certain depth and back. 4D survey models alterations in geological or geophysical characteristics of a given region of the earth by comparing seismic cubes corresponding to seismic acquisitions carried out at different times.

As used herein, "combo layer" refers to a combination layer created by combining two or more layers with similar properties into a single combined layer. A combo layer may be characterized by having a constant or bounded value throughout the layer for each of the attributes, or as they are sometimes referred to herein, for each of the subsurface conditions. An object of the present invention is to determine whether a combo layer is actually made up of two or more layers that can be resolved by the present inventive method into individual, distinct layers.

As used herein, "connectivity" is a measure of the communication (or lack thereof) between points within a geologic zone, which is closely related to the reservoir internal geometry and is commonly a primary factor controlling hydrocarbon production efficiency and ultimate recovery.

As used herein, "convolution" refers to a mathematical operation on two functions that is the most general representation of the process of linear (invariant) filtering. Convolution can be applied to any two functions of time or space (or other variables) to yield a third function, the output of the convolution. Although the mathematical definition is symmetric with respect to the two input functions, it is common in signal processing to say that one of the functions is a filter acting on the other function. The response of many physical systems can be represented mathematically by a convolution. For example, a convolution can be used to model the filtering of seismic energy by the various rock layers in the earth; deconvolution is used extensively in seismic processing to counteract that filtering.

As used herein, "exhaustive search" is a problem-solving technique that involves systematically enumerating all possible candidates for the solution and checking whether each candidate satisfies the problem's statement. Exhaustive search is sometimes referred to as a "brute-force search" or "generate and test".

As used herein, "F-test" is a statistical test in which a test statistic has a continuous probability distribution known as an F-distribution if a null hypothesis is true. Persons skilled in the art appreciate that the F-test was initially developed as a variance ratio.

As used herein, "impedance" means the product of density and velocity.

As used herein, "impact window" is defined to be a subset of data being considered that is likely to have an impact on the data corresponding to the layer being evaluated.

As used herein, "layer" refers to a subsurface, geologic region that exhibits minimal lithological variation or impedance change when seismic energy strikes boundaries of the subsurface, geologic region. Moreover, a layer may be represented by a single sample point or series of consecutive sample points that have similar properties.

As used herein, "lithofacies" and "facies" refer to the physical and organic properties and internal characteristics of formation or rock layers. A "seismic facies" is a stratigraphic unit or region that has a characteristic reflection pattern distinguishable from those of other areas. Regions of differing seismic facies are usually delineated using descriptive terms that reflect large-scale seismic patterns such as reflection amplitude, continuity, and internal configuration of reflectors bounded by stratigraphic horizons.

As used herein, "optimal," "optimizing," "optimize," "optimality," "optimization" (as well as derivatives and other forms of those terms and linguistically related words and phrases) are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution which may be the best available solution, a preferred solution, or a solution that offers a specific benefit within a range of constraints; or continually improving; or refining; or searching for a high point or a maximum for an objective; or processing to reduce a penalty function.

As used herein, "rock physics model" relates petrophysical and production-related properties of a rock formation to the bulk elastic properties of the rock formation. A rock physics model is typically constructed to describe the elastic properties of a reservoir to variations in rock matrix, fluid saturation, and reservoir pressure. Examples of petrophysical and production-related properties may include, but are not limited to, porosity, pore geometry, pore connectivity volume of shale or clay, estimated overburden stress or related data, pore pressure, fluid type and content, clay content, mineralogy, temperature, and anisotropy and examples of bulk elastic properties may include, but are not limited to, P-impedance and S-impedance.

As used herein, "seismic inversion" is a process for deriving a model of the earth's subsurface from seismic reflection data. First, the process attempts to extract information regarding the elastic properties of the subsurface from the data. This information is then used to construct a mathematical or physical model of the earth's subsurface, and synthetic seismograms are generated based on the model. If the synthetic seismograms do not compare favorably to the data, appropriate adjustments are made to the model, and new synthetic seismograms are generated for comparison with the data. This process repeats until the synthetic seismograms generated from the model approximate the actual data.

As used herein, "significant" or "significantly" may be defined according to a user-selected quantitative criterion.

As used herein, "subsurface" means beneath the top surface of any mass of land at any elevation or over a range of elevations, whether above, below or at sea level, and/or beneath the floor surface of any mass of water, whether above, below or at sea level.

As used herein, "texture", refers to the spatial variations and distribution patterns of constituents of a feature at a given scale in a specific geologic region. In the field of seismic stratigraphy, texture refers to lateral and vertical variations in reflection amplitude and waveform at a specific sample location in 3-D seismic domain, which may for example provide an acoustic expression of lateral and vertical variations in rugosity, lithology, and thickness of geologic layers in the 3-D stratigraphic domain.

As used herein, "texture analysis" is a study of one or more texture attributes of a geologic zone wherein seismic data is analyzed to extract patterns of common seismic signal character.

As used herein, "trace" is a record of received seismic signals.

FIG. 1 is a process flow diagram showing a method for predicting differences in subsurface conditions in accordance with an exemplary embodiment of the present invention. The method is generally referred to by the reference number 100. The method shown in FIG. 1 represents a workflow for deriving saturation and pressure through an exhaustive search methodology. In addition, the method 100 also relates to a vertical connectivity test for adjacent formations.

As will be apparent from the discussion below, an exemplary embodiment of the present invention may be useful in predicting differences in subsurface conditions. In particular, layers in subsurface data may be defined based on a first subsurface condition of interest such as a volume of shale (Vsh). Vsh is a known measure of whether a subsurface region is more likely to contain impenetrable rock or sand. Vsh is frequently expressed as a percentage or an index value between 0 and 1. Those of ordinary skill in the art will appreciate that a higher value of Vsh indicates a high presence of shale at the corresponding depth of the subsurface region. For example, a Vsh value of 1.0 corresponds to solid shale, which is unlikely to contain hydrocarbons. A lower value of Vsh indicates a higher likelihood of sand at the corresponding depth of the subsurface region.

A first layer may be defined for a plurality of adjacent data points having a

Vsh value less than 0.1. A second adjacent layer may be defined to include a plurality of adjacent data points having a Vsh value greater than 0.1. Thus, the layers are defined in such a way that a first subsurface condition corresponding to the data (Vsh) is relatively uniform therein.

An exhaustive search may be conducted to determine a best fit to known data by varying data corresponding to a second subsurface condition such as pressure for each of the layers. In particular, data corresponding to the second subsurface condition may be iteratively increased and each outcome tested with respect to error from known data. For example, a physical model of the subsurface may be generated wherein the second subsurface condition, pressure for example, is a model parameter. Then, this model is used to generate synthetic seismic data (or other type of geophysical data) by a process called forward modeling. The "data fit" of the present invention is then a comparison of the synthetic seismic data to the corresponding measured seismic data resulting from a seismic survey of the subsurface region. Then the value of the second subsurface condition (e.g., pressure or saturation) is incremented, and the process is repeated. In some embodiments of the invention, two or more second subsurface conditions, e.g. saturation and pressure, may be exhaustively searched. A best fit is achieved for the scenario (combination of saturation and pressure values) that produces the least error with respect to known data, e.g. data from a 4D seismic monitor survey. Those values are assigned to the current layer, i.e. to all locations in the current layer, and the process is repeated for the next layer, if any. In this manner, the measured seismic data is said to be inverted to obtain values of physical properties of the subsurface that affect propagation of acoustic waves, as those properties vary from one layer to the next. This is an outline of how the exhaustive search testing may be performed in the present invention. The resulting model may be used to predict subsurface conditions (for example, pressure values) for portions of the subsurface region for which no known data exists, and particularly differences in those subsurface conditions from one part of the subsurface region to the next. In such a manner, various portions of the subsurface region may be predicted to be more likely to produce valuable hydrocarbons than other portions of the subsurface region. Thus, the present inventive method may be used to predict whether specific parts of a subsurface region have hydrocarbon potential. The person trained in the technical field will be familiar with performing seismic inversion, which process is summarized next.

Seismic inversion is an example of a geophysical modeling process for deriving information about a subsurface region by determining the impedance structure of a subsurface region based on recorded seismic reflection data. Seismic inversion techniques rely upon seismic reflection data, typically obtained through a seismic survey and analysis of the seismic data from the survey. Seismic reflection techniques are typically based on the generation of seismic waves in the earth's surface, through the use of one or more seismic sources, for example, dynamite, air guns, vibrators, and the recording and analysis of the portions of these waves that get reflected at the boundaries between the earth's layers.

The following equation applies to a seismic inversion with an objective function L, which may defined as follows:

$$L = \sum_i (d - f(m))^2 \qquad (1)$$

where d is the data, $f$ is a function performed using an underlying model m to produce the data d. The equation for the objective function L gives a standard L2-Norm measure about how accurate the model fits the data. Those of ordinary skill in the art will appreciate that the L2-Norm is a well-known norm function that is used to measure error in numerical calculations. Moreover, the equation (1) provides an evaluation of the degree to which a mathematical function accurately represents measured data. For a saturation/pressure inversion problem, m stands for the changes of saturation and pressure that occur due to production from base to monitor time. For such a saturation/pressure inversion problem, d is the 4D seismic difference (Monitor seismic−Base seismic) and $f$ is a combination of a rock physics model, reflectivity, and convolution with a source wavelet. In addition, $f$ is non-linear. An exhaustive search methodology may be employed to find a global optimal solution without making approximations about $f$.

An exhaustive search methodology finds the optimal parameters in each layer of 4D data. For a given interval, the number of layers used should be as few as possible to keep computing time manageable. Moreover, an increase in the number of layers analyzed increases exponentially the number of parameters that are considered during an exhaustive analysis. Unfortunately, a smaller number of layers may decrease the resolution for the solution.

The method 100 represents a workflow that reduces the number of scenarios that are considered during an exhaustive search methodology by ignoring combinations of dimensions that are unlikely to represent a practical possibility. In addition, statistical tests are used to check whether the computational cost of adding an additional layer is warranted in the context of improving a fit to observed 4D data. In one exemplary embodiment of the present invention, the method produces an optimal minimal set of scenarios for exhaustive search, and also provides information about the connectivity between adjacent layers. Although the workflow 100 is based on deriving the saturation and pressure change from 4D seismic data, the workflow can find its use for inversion problems of geophysical properties, such as inverting for porosity and Vsh in a formation.

At block 102, the method begins. One or more combo layers are defined at block 104. In an exemplary embodiment of the present invention, a lithology model may be used, which is typically derived from either logs and/or seismic inversion data to represent a subsurface region, such as a reservoir. The lithology model may include multiple layers depending on the structures identified from the source data. To test saturation or pressure change within a reservoir, small layers of the lithology model are lumped into large combo layers as much as possible. Layers are desirably selected based on a similarity of a first subsurface condition of interest, such as Vsh. Moreover, if a property such as Vsh is similar in a layer, the behavior of the property within the layer may be thought of as relatively uniform. Generally, only two to three combo layers are used to start the analysis so that performing an exhaustive search is computationally realistic.

As shown at block 106, a sequential impact-only exhaustive search test is performed beginning with a first combo layer and progressing to the next combo layers that have not been evaluated. As set forth in detail below, an exhaustive search methodology in accordance with an exemplary embodiment of the present invention is considered to be impact-only because only data that is likely to have an impact on a current layer being evaluated is considered. Other data is ignored because it is not within an "impact window" of the data corresponding to the layer being evaluated. In this manner, the number of scenarios that are considered in the exhaustive search methodology may be reduced to a manageable number.

At block 108, a combo layer upon which block 106 has been completed may be tentatively subdivided into two layers for further evaluation. The subdivision of the combo layer being evaluated is done iteratively in a systematic manner. Moreover, layers are tentatively subdivided at a number of points, each of which is evaluated to determine whether subdividing the layer at that point results in a closer fit to known data compared to treating the layer as a single layer. As fully set forth below, the purpose of subdividing the layer being evaluated is to determine whether a second subsurface condition represented by the data is relatively uniform within the layer. If further evaluation in accordance with an exemplary embodiment of the present invention indicates that the second subsurface condition represented by the layer data is relatively uniform, the data corresponding to the layer being evaluated is maintained intact (i.e., the layer is not subdivided for consideration in subsequent exhaustive search methodologies). If the subsequent testing of the tentatively subdivided layers indicates that the second subsurface condition is not uniform within the layer, the layers are subdivided for purposes of further analysis.

In one exemplary embodiment of the present invention, an assumption is made that exemplary second subsurface conditions such as saturation and pressure change due to production are uniform within each layer. If, during an exhaustive search, the results of a comparison of predicted data to known data produces an unacceptable error, the assumption that the second subsurface condition is uniform is disproved and a determination is made about whether to subdivide the layer being considered into sublayers in order to maintain the assumption of a uniform second subsurface condition for the newly divided sublayers. This decision is based on a statistical analysis of whether subdividing an existing layer results in sublayers that more accurately conform to known data than the original single layer. In this manner, optimal parameters are searched one layer at a time in terms of minimizing the misfit to the data.

The interference from other layers is desirably considered in an exemplary embodiment of the present invention. Depending on the spectrum of the seismic data, the property variation from a certain distance has minimal effect. In accordance with an exemplary embodiment of the present invention, data corresponding to regions that have minimal effect on a layer being evaluated are defined to be outside the "impact window" for that layer. Data outside the "impact window" for a layer being evaluated may be ignored, thereby reducing the number of scenarios that are tested with an exhaustive search methodology to find optimal parameters. By not testing scenarios outside of the "impact windows" the number of scenarios that are tested may be kept within a computationally practical range.

At block 110, an exhaustive search methodology is applied to the tentatively subdivided layers to identify new optimal parameters for the tentatively subdivided layers. In so doing, each of the tentatively subdivided layers is assumed to represent uniformity with respect to a second subsurface condition. Moreover, data corresponding to the second subsurface condition is varied for each tentatively defined sublayer. Each variation of data corresponding to the second subsurface condition represents one scenario in an exhaustive search methodology. Each scenario is tested for conformity with known data, as explained below with respect to block 112.

At block 112, a determination is made relating to whether a data fitting error for the tentatively subdivided layers has been significantly reduced with respect to data for the layer without division (block 106). In one exemplary embodiment of the present invention, a statistical method known as an F-test is used to determine whether the division of a layer may significantly reduce the misfit to the 4D data as compared to if no division of the layer is performed. Those of ordinary skill in the art will appreciate that the degree of reduction in error that is considered significant may vary depending on the parameters being evaluated. Moreover, the determination of whether error reduction is significant is a design choice within the ability of those of ordinary skill in the art. If error is significantly reduced relative to the previous evaluation of the undivided combo layer, the current combo layer is subdivided, as shown at block 114. The subdivision occurs under the assumption that improved predictability of the second subsurface condition is worth the computational cost of adding an additional layer, and therefore additional scenarios corresponding thereto, for future exhaustive search methodologies. In an exemplary embodiment of the present invention, subdivided layers are not analyzed further and data corresponding to other layers is kept unchanged until those layers are themselves analyzed.

If, at block 112, a determination is made that error has not been significantly reduced with respect to when the tentatively subdivided layers were considered as a single layer (block 106), the layer is not subdivided, as shown in block 116. In this case, the data for the layer being evaluated is maintained as a single layer for purposes of further analysis.

At block 118, a determination is made relating to whether each of the combo layers defined previously (e.g., block 104) have been tested. If all combo layers have not been tested, process flow proceeds from block 118 to block 106, where evaluation of the next untested layer is performed as described above. When all combo layers have been tested, the process ends, as shown at block 120.

Figure 2:
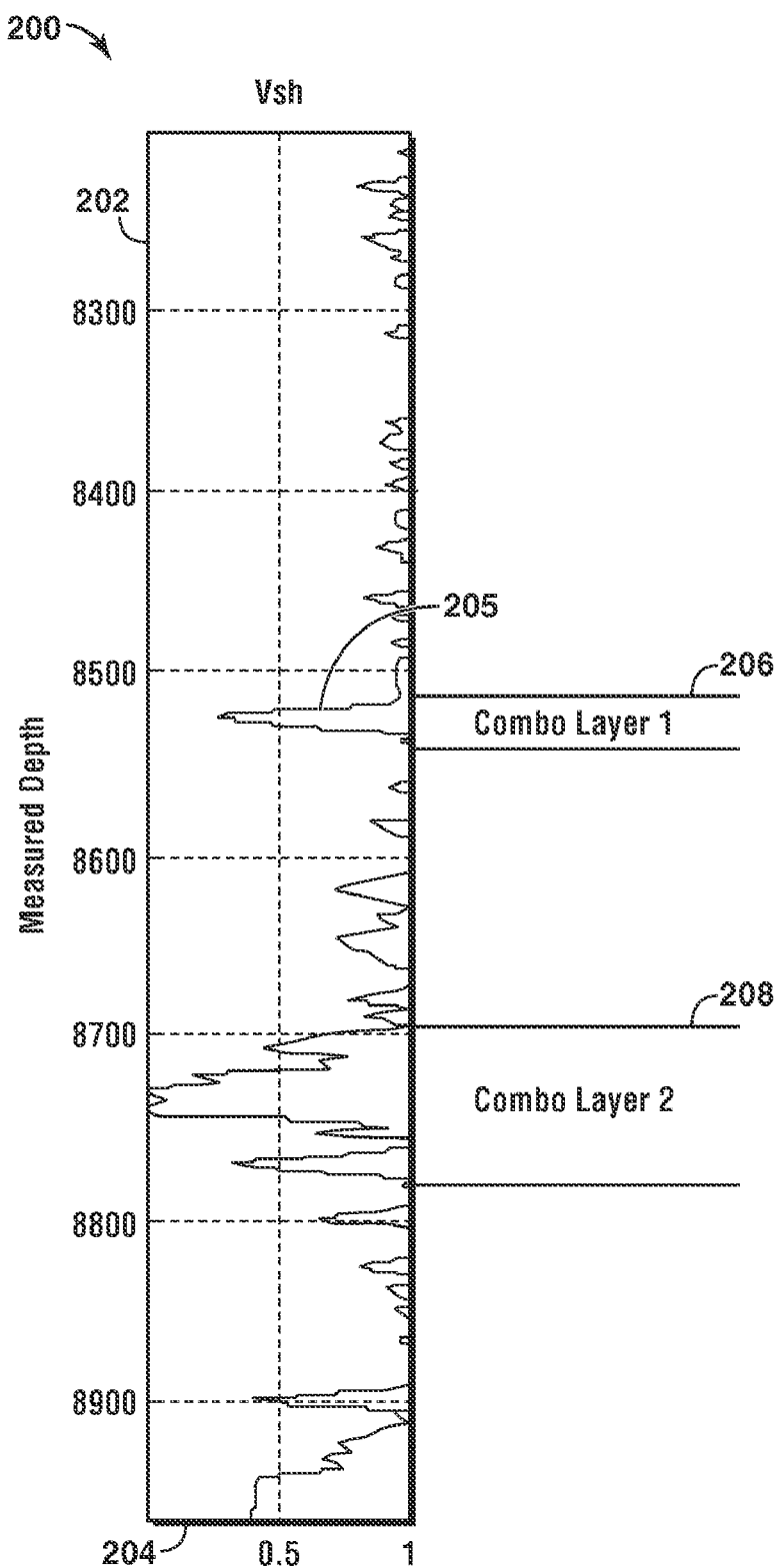
FIG. 2 is a graph showing a Vsh curve with combo layers identified in accordance with an exemplary embodiment of the present invention.

FIG. 2 is a graph showing a Vsh curve with combo layers 206 and 208 identified in accordance with an exemplary embodiment of the present invention. The graph is generally referred to by the reference number 200. A Vsh curve or log 205 indicates the location in measured depth of sand and shale layers. The graph 200 comprises a y-axis 202, which represents depth of a subsurface region. Additionally, the graph 200 comprises an x-axis 204, which represents an index value of Vsh at the corresponding depth in the subsurface region.

The graph 200 also includes a first combo layer 206 and a second combo layer 208. The combo layers 206, 208 are defined arbitrarily based on the relatively low values of Vsh in the combo layers 206, 208. As can be seen from the graph 200, the combo layers 206, 208 both include portions of the subsurface region having a Vsh value of less than 0.5. This indicates a likely presence of sand within each of the combo layers 206, 208. In general, combo layers may be identified by looking at apparent dominant facies. For 4D saturation and pressure inversion, the number of scenarios to consider in an exhaustive search methodology is relatively small as compared to general rock properties in an inversion because fluid and pressure changes occur only in the sand layers. The following discussion presupposes that the same saturation and pressure change apply to each single sand layer. In one exemplary subsurface region, in situ saturation of oil (So) for each of the combo layers 206, 208 is assumed to be 0.6 and the in situ saturation of water (Sw) is assumed to be 0.4. Under these conditions, a further assumption may be made that the possible saturation change ranges from an increase of gas saturation of 0.6 to an increase of water saturation of 0.6, without taking the residual oil situation into consideration. Residual oil is the remaining oil in a formation after fluids are flowed through the formation under normal conditions, for example primary and secondary recovery operations. Further, a range of pressure change is assumed to be from −500 psi to 500 psi. With a testing saturation increment of 0.2 and pressure increment of 100 psi, there may be 77 possible test scenarios for each of the combo layers 206, 208. The possible test scenarios for the two combo layers 206, 208 taken together may be 772 or 5,929. As more layers are included, the possible test scenarios increase exponentially. For example, if there are four layers with the same saturation and pressure ranges, the number of possible scenarios that may need to be evaluated for an exhaustive search methodology may be 774 or more than 35 million. As such, performing an exhaustive search methodology on this many possible scenarios may be extremely cumbersome and time consuming.

An exemplary embodiment of the present invention substantially reduces the total number of modeled scenarios by using an "impact window". By way of explanation, the seismic reflections from layers at a certain distance away may have no significant interference to the reflection of target layer. Accordingly, data corresponding to reflections that are unlikely to have an impact on the data for the target or current layer being considered are ignored because they are outside of the impact window. For the case study here, dominant frequency of seismic data is 45 Hz, which leads to an impact window with width of 50 ms. In the graph 200, the first combo layer 206 and second combo layer 208 are more than 50 ms apart. Therefore, 4D seismic data corresponding to the first combo layer 206 is not within the impact window of the data corresponding to the second combo layer 208, and vice versa. Accordingly, it is not necessary to consider scenarios in which data corresponding to the first combo layer 206 changes the data corresponding to the second combo layer 208. This means that each of the first combo layer 206 and the second combo layer 208 may be evaluated separately for exhaustive search purposes. This yields a total number of model scenarios of 77 for the first combo layer 206 plus a total number of model scenarios of 77 for the second combo layer 208, which adds up to 154 total scenarios that are evaluated. As may be appreciated, performing evaluations on this number of scenarios is more efficient relative to the exponential increase in scenarios that are to be evaluated from scenarios outside the impact window using conventional methodologies. In one exemplary embodiment of the present invention, layers are tested sequentially and an impact window is defined for each one to block out the testing of scenarios for other layers that have little interference effect for the layer being tested.

Figure 3:
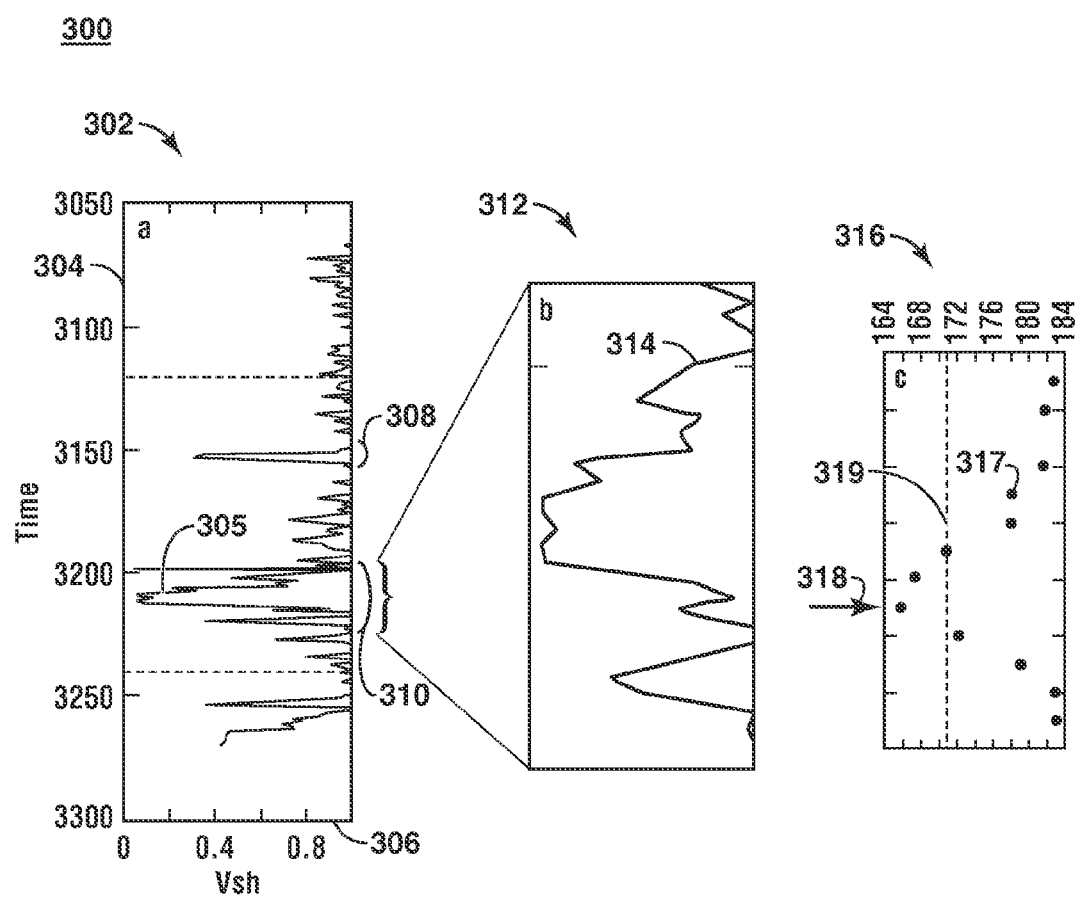
FIG. 3 is a graph that is useful in explaining a procedure of tentatively dividing a combo layer into two layers through statistical testing in accordance with an exemplary embodiment of the present invention.

FIG. 3 is a graph that is useful in explaining a procedure of tentatively dividing a combo layer into two layers through statistical testing in accordance with an exemplary embodiment of the present invention. The graph is generally referred to by the reference number 300. The graph 300 comprises a left panel 302, which includes a y-axis 304 that represents depth of a subsurface region in meters, and an x-axis 306 that represents an index of Vsh at the corresponding depth in the subsurface region. As set forth above, Vsh is represented as an index value between 0 and 1. For purposes of the discussion of FIG. 3, Vsh may be thought of as a first subsurface parameter of interest. The data values along the Vsh curve 305 include a first combo layer 308 and a second combo layer 310. The first combo layer 308 and the second combo layer 310 have been defined because of the likelihood that the corresponding area of the subsurface region represented by the data is likely to be a sand layer, increasing the likelihood that the corresponding area of the subsurface region contains hydrocarbons. This likelihood is represented by a relatively low value of Vsh in the combo layers 308, 310.

According to an exemplary embodiment of the present invention, the first combo layer 308 and second combo layer 310 may be initially defined from Vsh or gamma ray (GR) logs in a somewhat arbitrary manner. In addition, each combo layer 308 and 310 is initially assumed to be connected and well mixed by the initial arbitrary assignment of single pressure and saturation changes for each combo layer. In fact, the assignment of single pressure and saturation changes to each layer may not be correct even if the combo layers are well-connected. For example, a well-connected sand layer may have gas saturation increase at the top of the layer and a water saturation increase at bottom of the layer.

The graph 300 further includes a center panel 312. The center panel 312 includes an expanded trace 314 of the Vsh curve 305 shown in the left panel 302, which is represented with the same units (depth in meters). In particular, the expanded trace 314 includes the Vsh data for the second combo layer 310. The graph 300 further comprises a right panel 316, which displays the misfit to the 4D seismic data associated with sub-dividing the second combo layer 310 relative to when the second combo layer 310 is considered as a single layer. The error represents a measure of how well the parameter set being evaluated corresponds to known 4D seismic data when the second combo layer 310 is divided into two sub-layers at each given depth location. The horizontal axis shown in the right panel 316 represents a normalized root mean square (NRMS) error of seismic amplitude under an assumption that the second combo layer 310 is subdivided at that point. The vertical axis shown in the right panel 316 represents time in milliseconds. The error curve, which is comprised of the group of points 317 in the right panel 316, may be used to determine whether to divide the second combo layer 310 into additional layers through a statistical test. In particular, the misfit of the 4D seismic data represented by the error data may be used to determine whether to subdivide the second combo layer 310 for purposes of performing an exhaustive search methodology.

In an exemplary embodiment of the present invention, an F-test is used to test whether the saturation and pressure change are indeed the same for each of the combo layers defined in a data set. In particular, the following equation may be used:

$$F_{3,ndata-(n2-1)} = \frac{(SSE_1 - SSE_2)/3}{SSE_2/(ndata - (n_2 - 1))} \quad (2)$$

In this equation, the parameter ndata represents the number of samples in a given trace of 4D seismic data. These samples represent the known data which is the basis of comparison for whether a single combo layer or two subdivided layers most closely corresponds. $SSE_1$ represents the sum of squared errors when the combo layer in question is treated as a single layer. $SSE_2$ represents the sum of squared errors when the sand layer is divided into two layers as an alternative scenario. The parameter $n_2$ represents the number of parameters used for fitting to 4D data in the alternative scenario. When a combo layer is divided into two separate layers for fitting a 4D anomaly, the error generally becomes smaller because the number of variables used to fit the data has been increased. The F-test provides a statistical measure of whether the improvement in error reduction is significant. The level of the statistical significance can be found through a lookup table according to the F-value and the associated degrees of freedom.

A combo layer may be divided at selected locations or the splitting point may be moved across the layer to find the most optimal splitting location which corresponds to the lowest sum of squared errors. In the exemplary above, the data corresponding to the second combo layer 310 is systematically tested to determine whether the second combo layer 310 should be treated as two separate layers by dividing the combo layer at different locations from the top of the layer to the bottom of the layer. The group of points 317 show the misfit (error) associated with each tentative subdivision of the second combo layer 310. The error data (e.g., the points 317) of the right panel 316 indicates that saturation and a second subsurface parameter (in this case, pressure change from the top of the second combo layer 310) is significantly different from bottom of the layer at above a 95% confidence level, as shown by the data indicated by an arrow 318. The 95% confidence level is indicated by a dashed line 319. This data indicates that an optimal dividing location for the second combo layer 310 is at about 3,215 feet in depth, as indicated by the y-axis 304 in the left panel 302. When the second combo layer 310 is treated as two separate layers, this predicts that the top part of the second combo layer 310 is associated with a water saturation increase and a pressure increase, whereas there is no significant change either in saturation or pressure for bottom of the layer. This means that the use of the F-test indicates that the top and bottom portions of the layer 310 should be different layers at above 95% of the confidence level. This is consistent with known data that an oil-water contact is at about 3,215 feet in depth for the oil field represented by the data shown in FIG. 3.

In general, three possible factors may contribute to the need for a combo layer to be subdivided into two layers and therefore be treated separately in terms of the saturation and pressure change. The first factor is that the combo layer is separated by a barrier. In such a case, the layer should be treated as two separate sand layers with no vertical connection. The second factor is that the initial saturation and pressure state of the layer may be different. The third factor is gravitational separation in which gas saturation increases at the top of a layer and water saturation increases at the bottom of the layer. The data for the exemplary embodiment of the present invention represented in FIG. 3 indicates that the first and second factors may apply to the data shown therein.

As set forth herein, an exemplary embodiment of the present invention can be used in a single cycle reservoir for testing the vertical distribution of fluid or pressure. Additional exemplary embodiments may be intended to be used with data corresponding to a stacked reservoir, in which the fluid and pressure from different reservoir compartments may or may not be in communication.

Figure 4:
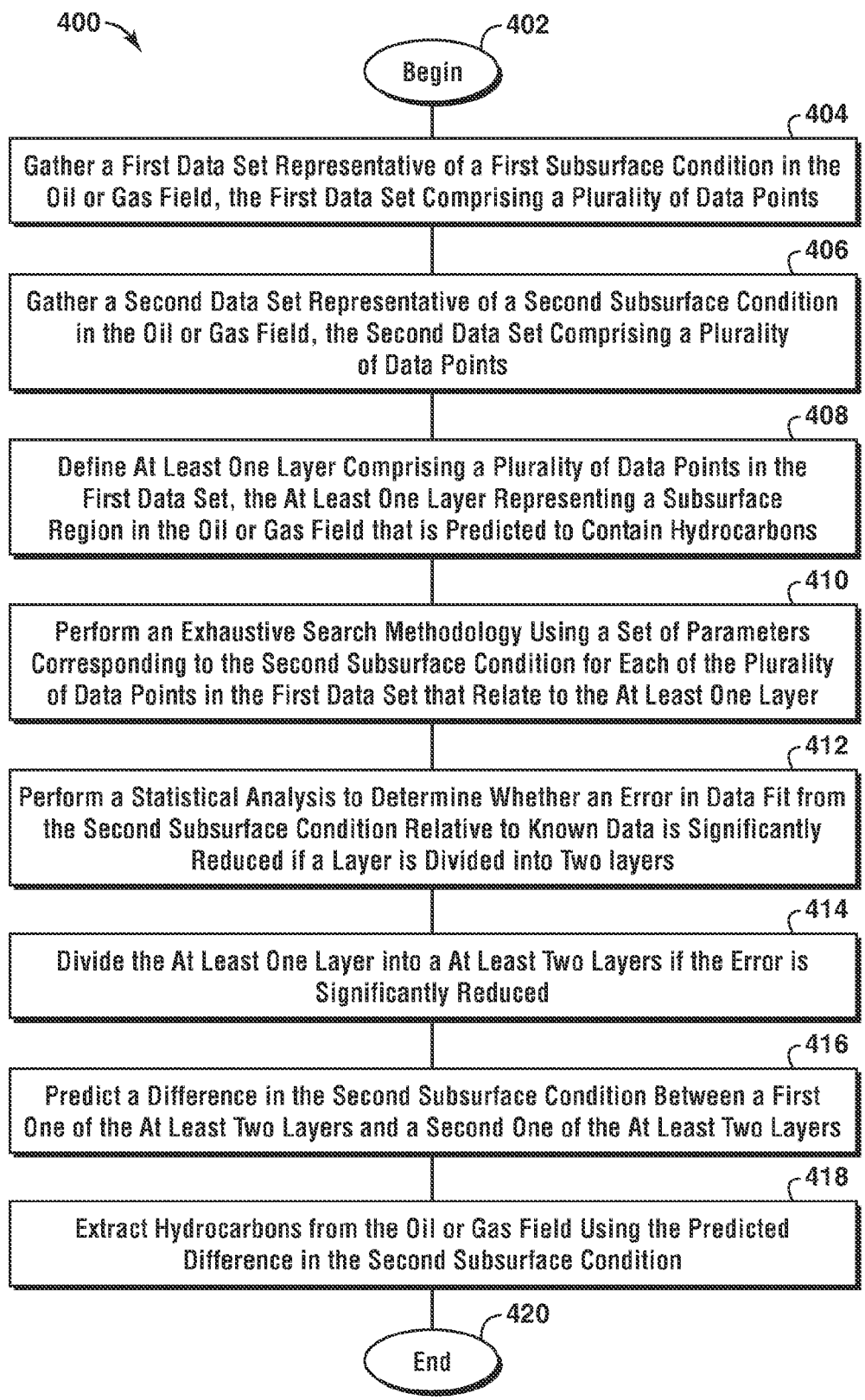
FIG. 4 is a process flow diagram showing a method for producing hydrocarbons from an oil and/or gas field in accordance with an exemplary embodiment of the present invention.

FIG. 4 is a process flow diagram showing a method for producing hydrocarbons from an oil and/or gas field in accordance with an exemplary embodiment of the present invention. The method is generally referred to by the reference number 400. At block 402, the method begins.

At block 404, a first data set representative of a first subsurface condition in the oil or gas field is gathered. In an exemplary embodiment of the present invention, the first data set comprises a plurality of data points. The first subsurface condition may be, for example, Vsh.

At block 406 a second data set representative of a second subsurface condition in the oil or gas field is gathered. Like the first data set, the second data set may comprise a plurality of data points. Examples of subsurface conditions that may comprise the second subsurface condition include pressure, oil saturation, water saturation, vertical connectivity or the like.

In an exemplary embodiment of the present invention, a layer comprising a plurality of data points in the first data set is defined, as shown at block 408. The at least one layer may represent a subsurface region in the oil or gas field that is predicted to contain hydrocarbons. As set forth above, the layer may be chosen because of a likelihood that the corresponding subsurface region has a large degree of sand disposed in it, making it more likely that the subsurface region contains hydrocarbons.

At block 410, an exhaustive search methodology is performed using a set of parameters corresponding to the second subsurface condition for each of the plurality of data points in the first data set that relate to the at least one layer. A statistical analysis is performed, as shown at block 412, to determine whether an error in data fit can be significantly reduced by dividing one of the combo layers into two layers. If the error reduction is significant, it is likely that there is a variation in the second subsurface condition within the layer as it is currently defined. This indicates that dividing the layer into more than one layer may produce more accurate results. Accordingly, the layer is divided into at least two layers if the statistical analysis indicates that the error is significantly reduced, as shown at block 414. In one exemplary embodiment of the present invention, the process steps represented by blocks 410, 412 and 414 are repeated until all combo layers, including newly divided layers, are tested and no further statistically significant data fit improvements can be made.

At block 416, a prediction is made with respect to a difference in the second subsurface condition over time for the newly divided layers. Hydrocarbons are extracted from the oil or gas field using the predicted difference in the second subsurface condition, as shown at block 418. At block 420, the method ends.

FIG. 5 is a block diagram showing a tangible, machine-readable medium that stores code adapted to perform a method in accordance with an exemplary embodiment of the present invention. The tangible, machine-readable medium is generally referred to by the reference number 500. The tangible, machine-readable medium 500 may comprise one or more hard disk drives, a DVD, a CD or the like.

The tangible, machine-readable medium 500 stores computer-readable code 502, which is adapted to represent at least one layer comprising a plurality of data points in a data set representing a first subsurface condition. In an exemplary embodiment of the present invention, the at least one layer may represent a subsurface region that is predicted to contain hydrocarbons. Code 504 is adapted to perform an exhaustive search methodology using a set of parameters corresponding to a second subsurface condition for each of the plurality of data points in the first data set that relate to the at least one layer.

Code 506 stored on the tangible, machine-readable medium 500 is adapted to perform a statistical analysis to determine whether an error in data fit can be significantly reduced by dividing one of the combo layers into two layers. In addition, the tangible, machine-readable medium 500 stores code 508, which is adapted to divide the at least one layer into at least two layers if the error is significantly reduced.

Figure 6:
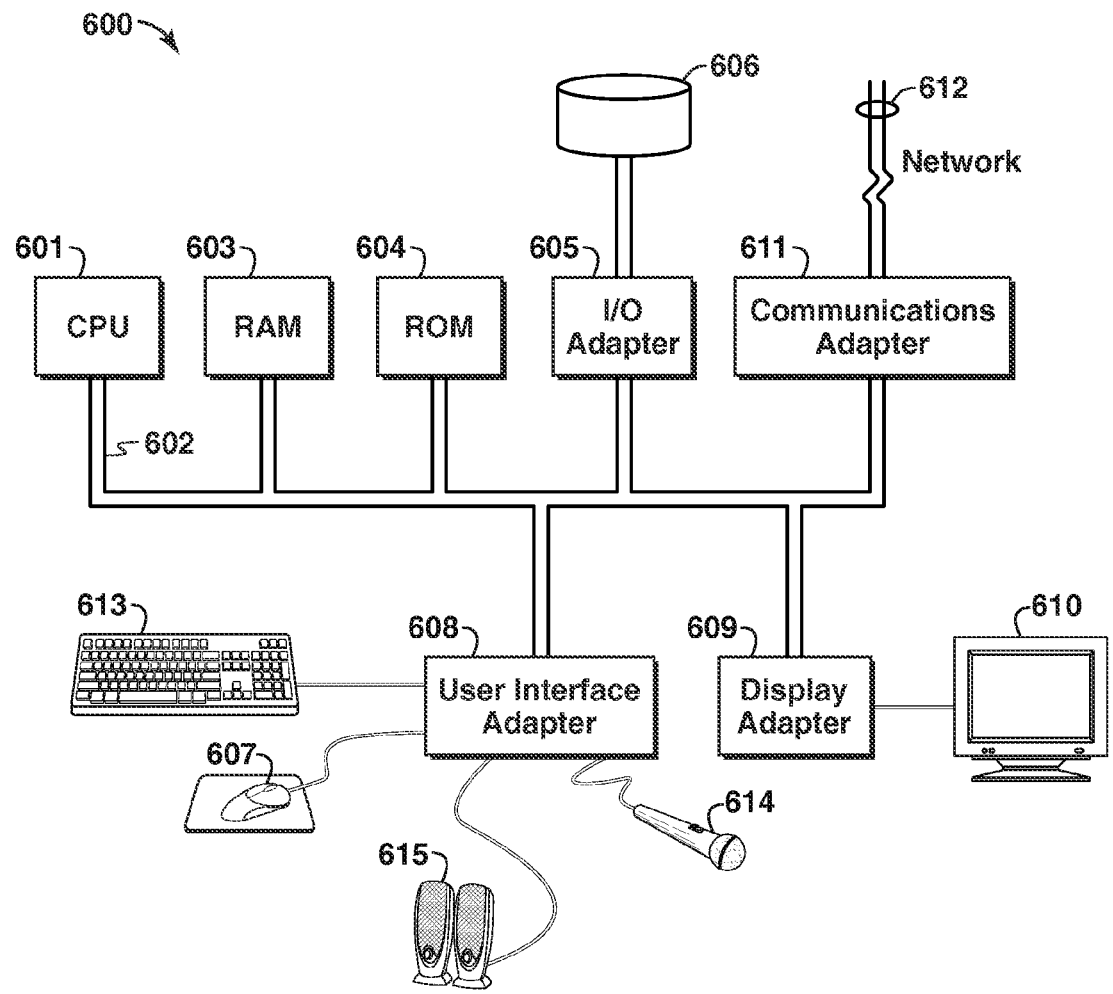
FIG. 6 illustrates an exemplary computer network that may be used to perform the method for predicting differences in subsurface conditions as disclosed herein, and is discussed in greater detail below.

FIG. 6 illustrates an exemplary computer system 600 on which software for performing processing operations of embodiments of the present invention may be implemented. Central processing unit (CPU) 601 is coupled to system bus 602. CPU 601 may be any general-purpose CPU. The present invention is not restricted by the architecture of CPU 601 (or other components of exemplary system 600) as long as CPU 601 (and other components of system 600) supports the inventive operations as described herein. CPU 601 may execute the various logical instructions according to embodiments. For example, CPU 601 may execute machine-level instructions for performing processing according to the exemplary operational flow described above in conjunction with Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for operations of embodiments of the present invention. The data storage of computer system 600 may be used for storing such information as data referenced in flow diagram blocks of FIG. 4, and/or other data used or generated in accordance with embodiments of the present invention. Communications adapter 611 is preferably adapted to couple computer system 600 to network 612, which may enable information to be input to and/or output from system 600 via such network 612 (e.g., the Internet or other wide-area network, a local-area network, a public or private switched telephony network, a wireless network, any combination of the foregoing). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display information pertaining to a target area under analysis, such as displaying a generated 3D representation of the target area, according to certain embodiments.

It shall be appreciated that the present invention is not limited to the architecture of system 600. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Those of ordinary skill in the art will appreciate that an exemplary embodiment of the present invention may reduce the cost of developing fields containing hydrocarbon resources by reducing the computational cost and complexity of performing an exhaustive search methodology. Moreover, accurate saturation and pressure predictions should improve in-fill well placement, help to locate bypass hydrocarbon resources, better define reservoir connectivity between different compartments and improve history matching for reservoir simulation. In addition, an exemplary embodiment of the present invention may be used for not only deriving saturation and pressure change, but also testing the vertical connectivity from the 4D seismic data or other connectivity in the context of quantitative stratigraphic interpretations.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

The invention claimed is:

1. A method for predicting differences in subsurface conditions in a subsurface region, the method comprising:
defining at least one layer comprising a plurality of data points in a data set representing a first subsurface condition;
performing an exhaustive search methodology using a set of parameters corresponding to a second subsurface condition for each of the plurality of data points in the first data set that relate to the at least one layer or to a lesser number of such data points that are predicted to have a significant impact on data fit below, wherein synthetic geophysical data, generated using a model having the first and second subsurface conditions as a model parameters, is compared to measured geophysical survey data, and a best data-fit set of second subsurface condition values is selected;

performing a statistical analysis to determine whether error in the data fit of the synthetic data relative to the measured data is significantly reduced if one of the at least one layer is subdivided into at least two layers;

dividing the at least one layer into at least two layers if the error is significantly reduced; and predicting a model showing variation of the second subsurface condition at a time when the measured geophysical survey data were obtained;

wherein at least the performing an exhaustive search methodology and the performing a statistical analysis are performed using a computer.

2. The method of claim 1, wherein the first subsurface condition comprises an index that represents a volume of shale (Vsh) at a particular point in the subsurface region.

3. The method of claim 1, wherein the second subsurface condition comprises one of a group consisting of a pressure, a saturation of oil, a saturation of water, and vertical connectivity.

4. The method of claim 1, wherein the statistical analysis comprises an F-test.

5. The method of claim 1, further comprising using the predicted subsurface condition model to predict hydrocarbon potential.

6. The method of claim 1, wherein the lesser number of data points that are predicted to have a significant impact on data fit are searched using an impact window related to seismic wavelength.

7. The method of claim 1, further comprising repeating the method using measured geophysical data from a different survey of the same subsurface region, conducted at a second, different time, and comparing results to determine a difference in subsurface conditions due to intervening production of hydrocarbons from the subsurface region.

8. The method of claim 7, further comprising using the comparison of results, from the two surveys conducted at different times, to predict a difference in subsurface conditions at a third time, said third time being later than the time of either survey.

9. The method of claim 7, wherein said at least one layer is selected to correspond to at least one layer known from the subsurface region's production history to contain hydrocarbons.

10. A method for producing hydrocarbons from an oil and/or gas field, the method comprising:

obtaining a data set representative of a first subsurface condition in the oil or gas field, the data set comprising a plurality of data points;

defining at least one layer comprising a plurality of data points in the data set, the at least one layer representing a subsurface region in the oil or gas field that is predicted to contain hydrocarbons;

performing an exhaustive search methodology using a set of parameters corresponding to the second subsurface condition for each of the plurality of data points in the data set that relate to the at least one layer or to a lesser number of such data points that are predicted to have a significant impact on data fit below, wherein synthetic geophysical data, generated using a model having the first and second subsurface conditions as a model parameters, is compared to measured geophysical survey data, and a best data-fit set of second subsurface condition values is selected;

performing a statistical analysis to determine whether error in the data fit of the synthetic data relative to the measured data is significantly reduced if one of the at least one layer is subdivided into at least two layers;

dividing the at least one layer into at least two layers if the error is significantly reduced;

predicting a model showing variation of the second subsurface condition at a time when the measured geophysical survey data were obtained; and extracting or managing production of hydrocarbons from the oil or gas field using the predicted model.

11. The method of claim 10, wherein the first subsurface condition comprises an index that represents a volume of shale (Vsh) at a particular point in the subsurface region.

12. The method of claim 10, wherein the second subsurface condition comprises one of a group consisting of a pressure, a saturation of oil, a saturation of water, and vertical connectivity.

13. The method of claim 10, wherein the statistical analysis comprises an F-test.

14. The method of claim 10, wherein the lesser number of data points that are predicted to have a significant impact on data fit are searched using an impact window related to seismic wavelength.

15. A computer program product, comprising a non-transitory computer-readable medium having a computer readable program code embodied therein, said computer readable program code comprising:

code adapted to represent at least one layer comprising a plurality of data points in a data set representing a first subsurface condition, the at least one layer representing a subsurface region that is predicted to contain hydrocarbons;

code adapted to perform an exhaustive search methodology using a set of parameters corresponding to a second subsurface condition for each of the plurality of data points in the first data set that relate to the at least one layer or to a lesser number of such data points that are predicted to have a significant impact on data fit below, wherein synthetic geophysical data, generated using a model having the first and second subsurface conditions as a model parameters, is compared to measured geophysical survey data, and a best data-fit set of second subsurface condition values is selected;

code adapted to perform a statistical analysis to determine whether error in the data fit of the synthetic data relative to the measured data is significantly reduced if one of the at least one layer is subdivided into at least two layers; and code adapted to divide the at least one layer into at least two layers if the error is significantly reduced.

16. The tangible, machine-readable medium of claim 15, wherein the statistical analysis comprises an F-test.

* * * * *